April 20, 1971    A. M. BIGLIARDI, JR., ET AL    3,575,694

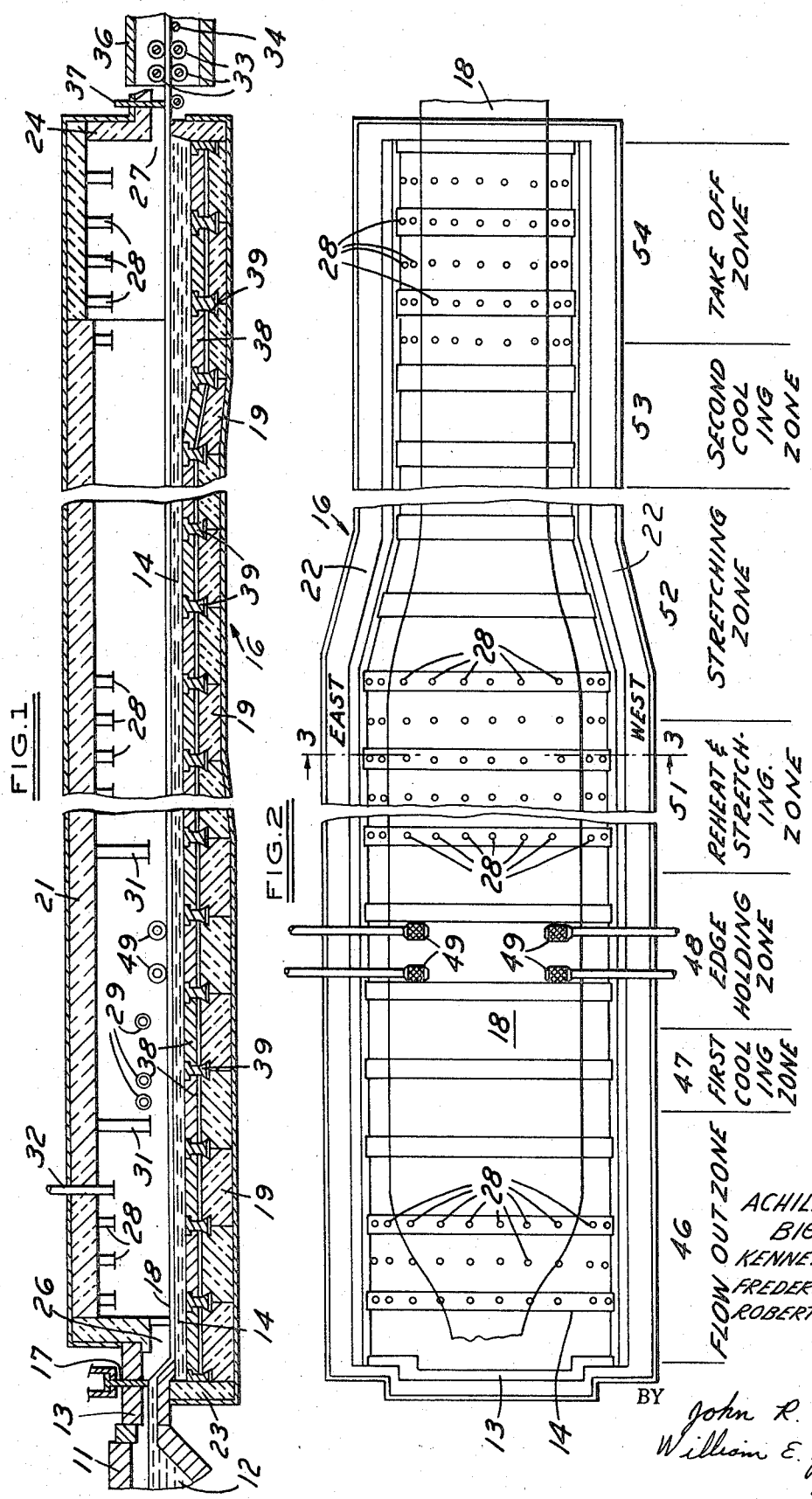

METHOD OF MANUFACTURING TAPERED GLASS

Filed Aug. 30, 1968      3 Sheets-Sheet 2

ACHILLE M. BIGLIARDI, JR.
KENNETH E. COBURN
FREDERICK A. SCHEER
ROBERT J. THOMPSON
           INVENTORS

BY John R. Faulkner
William E. Johnson
           ATTORNEYS

April 20, 1971   A. M. BIGLIARDI, JR., ET AL   3,575,694
METHOD OF MANUFACTURING TAPERED GLASS Filed Aug. 30, 1968   3 Sheets-Sheet 3

TRAVEL →

| 51 REHEAT & STRETCHING | | 52 STRETCHING | EAST |
|---|---|---|---|
| 1404 | 1423 | | 14 |
| -1411 | -1432 | -1454 | 1485 |
| -1425 | -1442 | -1476 | 1513 |
| -1443 | -1458 | -1512 | 1539 |
| -1458 | -1476 | -1539 | 1576 |
| -1465 | -1501 | -1576 | 1607 |
| -1504 | -1542 | -1611 | 1639 |
| -1524 | -1569 | -1650 | 1701 |
| -1535 | -1589 | -1690 | 1726 |
| | -1675  18 | -1762 | 1753 |
| -1553 | -1684 | -1774 | 1729 |
| -1546 | -1664 | -1785 | 1721 |
| -1535 | -1683 | -1762 | 1719 |
| -1524 | -1684 | -1765 | 1713 |
| -1521 | -1695 | -1762 | |
| -1515 | -1697 | -1756 | |
| -1504 | | | |

FIG. 5   WEST

ACHILLE M. BIGLIARDI, JR.
KENNETH E. COBURN
FREDERICK A. SCHEER
ROBERT J. THOMPSON
INVENTORS

BY
John R. Faulkner
William E. Johnson
ATTORNEYS

United States Patent Office 3,575,694
Patented Apr. 20, 1971

3,575,694
METHOD OF MANUFACTURING TAPERED GLASS
Achille M. Bigliardi, Jr., Inkster, Kenneth E. Coburn, Franklin, and Frederick A. Scheer, Dearborn, Mich., and Robert J. Thompson, Nashville, Tenn., assignors to Ford Motor Company, Dearborn, Mich.
Filed Aug. 30, 1968, Ser. No. 756,439
Int. Cl. C03b 18/02
U.S. Cl. 65—63                                          3 Claims

ABSTRACT OF THE DISCLOSURE

A method of producing a glass ribbon with a tapering thickness across the width thereof has the following steps. Molton glass forming materials are flowed out upon a molten tin bath to produce a glass ribbon of substantially uniform thickness. The molten glass ribbon moves in a direction downstream of the chamber and the ribbon is uniformly cooled to a temperature whereat the viscous glass is semi-rigid and resistant to flow. Advancement of the glass ribbon is retarded by edge rolls engaging opposite edges of the glass ribbon. The heat content of the glass ribbon across the width thereof is controlled to establish a differential temperature profile in the ribbon of glass. The higher temperature portion of the ribbon achieves a pliable condition while the cooler portion of the ribbon remains resistant to flow. A stretching force is applied to the glass ribbon between the point of retardation and the end of the processing chamber and this force attenuates the glass ribbon differentially to produce a taper in the glass ribbon across its width. The attenuated ribbon is thicker at that portion originally at the higher temperature.

BACKGROUND OF THE INVENTION

This invention relates to a process utilized for the manufacture of flat glass by a float process. In the float process, molten glass is poured on the surface of a bath contained in a chamber to obtain a glass ribbon having lustrous, fire polished faces on both sides thereof. Generally, in the float process, the molten bath is formed from metal having a density greater than that of molten glass. By known means, the molten glass is delivered at a uniform rate to the surface of the molten bath to form a ribbon of glass. The ribbon is advanced along the surface of the bath under thermal conditions which permit the leading portion thereof to continuously harden to a degree sufficient to permit its removal from the bath without harm to the surfaces thereof. Upon its removal from the chamber, the ribbon of glass passes through an annealing lehr and is subjected to further conventional processing.

The molten bath, which supports the glass, is contained within a substantially enclosed chamber having upper and lower refractory sections joined by side and end wall structures. The end wall structures have therein entrance and exit passageways through which, respectively, the molten glass is fed to and the glass ribbon removed from the chamber. The lower refractory section forms the container for receiving and supporting the molten metal bath. The space within the chamber above the bath is filled with a protective atmosphere to prevent oxidation of the metal forming the bath.

One of the prime characteristics of the float process is that it produces a continuous glass ribbon which has the upper and lower surfaces thereof in substantial parallelism. The glass so produced is of a uniform thickness across the width thereof and the thickness of the ribbon remains a constant over substantial lengths of the ribbon. The uniformity of glass thickness is attributable to the uniformity in the processing of the glass in the processing chamber.

The uniform thickness characteristic of glass produced by a float process has been very advantageous in the marketing of such glass. More particularly, the uniform thickness of the glass, in conjunction with its highly desirable surface finish characteristics have substantially reduced defects in the glass causing visual distortions. The glass has found wide customer preference because the use of such glass in a glazing structure permits a rather clear vision therethrough.

However, in certain instances, the utilization of glass having a uniform thickness in a glazing structure has produced objectionable viewing therethrough. For example, if two sheets of uniform and equal thickness glass are used in a glazing structure wherein the sheets are mounted in a spaced, parallel relationship, interference fringes may be observable in the glass when the glass is viewed against a dull background. Such a condition is more particularly described in copending application Ser. No. 756,437, filed Aug. 30, 1968, and assigned to the same assignee as this application.

Thus, in some instances, the desirable characteristic found in float glass, namely its uniform thickness, has been a disadvantage. It therefore becomes desirable, in certain glazing structures, to utilize a float glass which does not have a uniform thickness across its length and width. It is desirable to utilize float glass because the glass does have such desirable surface characteristics.

SUMMARY OF THE INVENTION

This invention relates to a process of manufacturing glass by the float process and more particularly to a process for manufacturing float glass which results in the production of a ribbon of glass having a taper therein extending across the width thereof.

In order to produce a glass ribbon having a tapering thickness across the width thereof, the following process steps are carried out. Molten glass forming materials are flowed out to form a glass ribbon upon the surface of a molten bath contained in a cavity formed by refractory material housed in a substantially enclosed chamber. The heat content of the glass ribbon is controlled to establish a differential temperature profile across the width of the glass ribbon. A stretching force is applied to the glass ribbon to attenuate the ribbon and produce a taper in the glass ribbon across its width. The attenuated ribbon is thickest at the portion thereof at the highest temperature when the differential temperature profile is established in the ribbon. The ribbon of glass is cooled while attenuated whereby a glass ribbon having a taper across the width thereof is produced. The ribbon is cut into individual glass brackets, the glass brackets exhibiting a tapering thickness.

In greater detail, the method of producing a continuous glass ribbon having a tapering thickness across the width thereof is initiated by melting and delivering molten glass forming materials to the surface of a molten bath contained in a cavity formed by refractory material housed in a substantially enclosed chamber in order to form a pool of glass in the chamber. The molten glas is flowed out of the pool in a direction downstream of the chamber to form a ribbon of glass of substantially uniform thickness across the width thereof. The ribbon of glass is cooled to a temperature whereat the ribbon is resistant to flow. The further advancement of the ribbon in a direction downstream of the chamber is then retarded. The heat content of the glass ribbon is thereafter controlled by a differential reheating or cooling of the glass ribbon to establish a differential temperature profile in the ribbon. The higher temperature portion of the ribbon is more fluid-like than the cooler temperature portion of the ribbon which is semi-rigid and more capable of developing stress. A stretching force is applied to the glass ribbon between the position where the ribbon is retarded and the end of the processing chamber. This stretching force attenuates the glass ribbon differentially to produce a taper in the ribbon, the attenuated ribbon being thicker at the portion thereof originally at the higher temperature. The ribbon of glass is cooled in its unattenuated state and is cut into individual glass brackets which exhibit a taper therein.

BRIEF DESCRIPTION OF THE DRAWINGS

FIG. 1 is a diagrammatic, longitudinal section of a float glass chamber which may be utilized to produce float glass in accordance with the teachings of this invention. FIG. 2 is a diagrammatic, horizontal section through the chamber of FIG. 1. FIG. 5 is a graphical representation of the varying thickness of the glass produced by the process of this invention.

DESCRIPTION OF THE PREFERRED EMBODIMENT

General chamber construction

Figure 3:
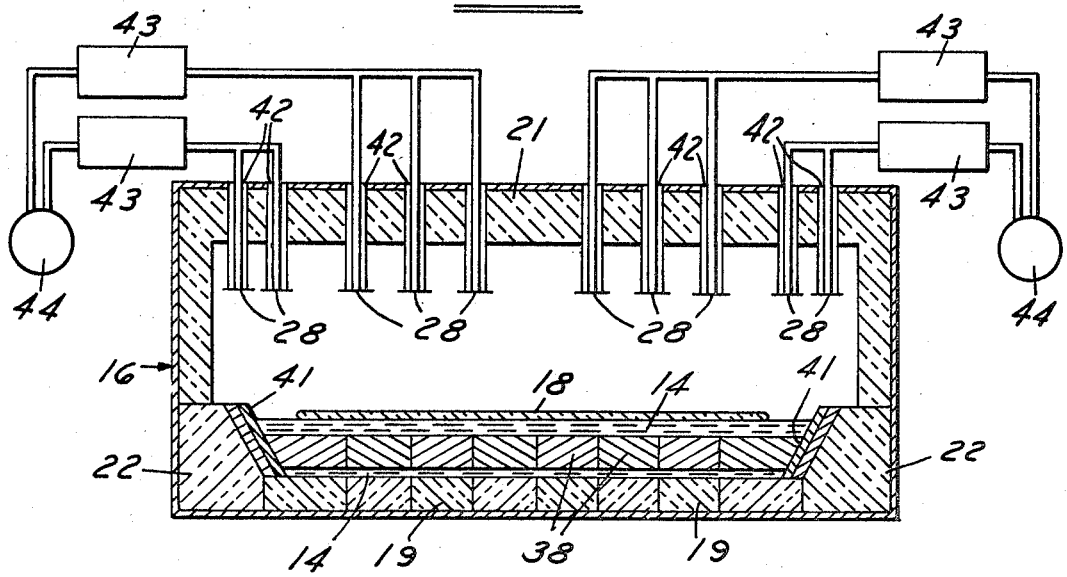
FIG. 3 is a vertical section taken along line 3—3 of FIG. 2.

In FIG. 1, there is seen the delivery end of a conventional glass melting furnace 11 in which a constant level of molten glas 12 is maintained. The molten glass is delivered through a forehearth 13 onto the surface of a molten metal bath 14 of tin or an alloy of tin contained within a chamber 16. A tweel 17 controls the rate at which the glass 12 flows from the furnace 11. The tin bath 14 has a density greater than that of the molten glass 12 so that the glass will float on the surface thereof. By delivering the glass at a constant rate to the bath, a continuous ribbon of glass 18 is produced.

The chamber 16 is defined by a lower refractory section, comprising a plurality of refractory blocks 19, an upper refractory section 21, refractory side sections 22 and refractory end walls 23 and 24. All of the refractory walls or sections are both formed from a plurality of refractory blocks and jointed together except for an entrance 26 and an exit 27 to provide the substantially enclosed chamber 16. The refractory side sections 22 and refractory end walls 23 and 24 project above the top surface of the lower refractory blocks 19 to define, in conjunction with the lower refractory section, the container or cavity for the bath of molten tin 14.

To maintain the tin in a molten condition and the glass ribbon 18 at the proper temperature required to form a ribbon of good optical quanlity, electrical heaters 28 (FIG. 1) are installed in the roof or upper refractory section 21 of the chamber 16 in various zones of the chamber. These heaters will be described in more detail in a subsequent portion of this specification. Coolers 29 may also be provided in select zones of the chamber 16 in order to remove heat from the glass ribbon 18. Also, radiation gates 31 (FIG. 1) may be secured to the upper refractory section 21 to extend downwardly therefrom toward the glass ribbon 18 passing thereunder for the purpose of dividing the chamber 16 into various hot and cool zones.

An atmosphere gas is introduced into the chamber 16 through gas inlets 32 in order to provide a protective atmosphere within the chamber above the molten tin 14 and the glass ribbon 18 floating thereupon. The atmosphere gas should be inert towards carbonaceous material and the tin making up the bath and actively reducing toward tin oxide. An atmosphere gas composition is more fully described in U.S. Pat. 3,332,763, issued July 25, 1967, and asigned to the same assignee as this application.

A procesed glass ribbon is withdrawn from the chamber 16 by driven traction rollers 33 onto a conveyor 34 to enter an annealing lehr 36 where the ribbon is further cooled under controlled conditions to remove or reduce residual stresses therein. The exit 27 of the chamber 16 may be provided with a sealing member 37 both to to retain the protective atmosphere gas in and to prevent the entrance of outside atmosphere into the chamber 16.

As described more fully in U.S. Pat. 3,393,061, issued July 16, 1968, and assigned to the same assignee as this application, a series of rectangular liner slabs 38, of solid carbonaceous material, such as graphite, are provided in the chamber 16. As best seen in FIG. 1, the slabs 38 are installed so as to cover or line, preferably, the entire bottom area of the tin bath 14 in the chamber 16. However, it should be appreciated that the slabs 38 are preferably coextensive with the individual refractory blocks 19 defining the lower refractory section. More particuiarly, the number of liner slabs 38 is both equal in number to and identical in size with the refractory ceramic blocks 19 necessary to define one transverse width of the lower refractory section so that if any upheaval in the lower refractory section occurs dring utilization of the chamber, the slabs 38 will adjust to the situation and there will be no buckling or cracking of a unitary piece of graphite.

With reference to FIG. 1, each series of liner slabs 38 is held in position by a plurality of transversely extending keys 39. There is a plurality of keys 39 associated with each individual liner slab 38. The manner of utilizing the keys and slabs to line the chamber is described in detail in the above mentioned patent.

Since the liner slabs 38 and the keys 39 are made from a carbonaceous material, such as the preferred graphite, which material is substantially less dense than the tin, the slabs and keys are raised above the lower refractory section by a buoyant force exerted thereon by the molten tin. The slabs and keys do not rise to the top surface of the tin and float thereupon because of the manner in which the keys are supported in the lower refractory section. A depth of tin above the slabs 38 is maintained at a level of ½ to 4 inches in order to reduce the likelihood of the glass ribbon 18 coming in contact with the slabs if and when the glass buckles within the chamber 16.

As best seen in FIG. 3, the refractory side blocks 22 extend above the top surface of the lower refractory blocks 19. A side wall liner 41, comprising one continuous, or in the alternative, several slabs of graphite, is mounted by suitable members (not shown) adjacent the refractory side blocks 22 for the entire length of each side of the chamber 16. The side wall liner 41 is utilized to provide protection for the refractory side blocks in the event that the glass ribbon ruptures and a portion thereof moves towards the side wall of the chamber 16.

The utilization of the carbonaceous liner blocks and the carbonaceous keys and the carbonaceous side wall liners is not necessary in the performance of the method of this invention. However, these elements have been described in the preferred embodiment of this invention on the basis that the utilization of carbonaceous material in conjunction with the described protective atmosphere results in the improved operation of the float chamber. The defect commonly known as "bloom" is substantially reduced in the production of float glass in such a liner chamber. The defect of "bloom" is caused by the discoloration of a layer of tin oxide adherent to the surface of the glass ribbon when the glass ribbon is heated to a temperature sufficient to allow bending of the glass. However, when both carbonaceous material and the protective atmosphere are employed in the chamber, the defect of "bloom" in float glass is substantially eliminated because of an interaction between the carbonaceous liner and the protective atmosphere which eliminates the tin oxide present in the tin bath.

As best seen in FIG. 1, a plurality of heating elements 28 extend across the width of the chamber 16 in various zones thereof. In FIG. 3, these heating elements are shown in greater detail. More particularly, the electrical heating elements 28 extend through sealed conduits 42 positioned in the upper refractory section 21 into the chamber 16 to approximately 12 to 16 inches above the surface of the molten metal bath 14. The electrical heating elements are, preferably, of a three-legged silicon carbide electrode construction—three phase—producing up to five kw. per element. The elements 28 are supported by support clamps (not shown) attached to the upper refractory section 21.

As best seen in FIG. 3, each individual may, or preferably, a group of electrical heating elements 28 are connected through a control unit 43, which may be in the form of a rheostat, to a power source 44. The control unit permits adjustment for each individual, or group, of heating elements from 0 to a maximum kw. setting to meet the temperature requirements of the process.

The chamber 16 is divided into several zones to identify the functions performed or the conditions imposed in the chamber to allow for the formation of a glass ribbon of a specified thickness and of a desired quality. At the beginning of the chamber 16, a flow out zone 46 is provided. In the flow out zone, the molten glass 12 flowing through the forehearth 13 is delivered to the surface of the bath 14 on which it spreads out to form the ribbon 18. Adjacent the flow out zone is a first cooling zone 47 in which the coolers 29 are disposed over the ribbon 18, as best seen in FIG. 1. The next zone, as seen in FIG. 2, is an edge holding zone 48 in which edge rolls 49 are applied to the ribbon 18. After the rolls are applied, the ribbon 18 is reheated in a reheat and stretching zone 51 to change the viscosity of the glass to permit it to be stretched longitudinally by the rollers 33 located in the annealing lehr 36. After reheat, an additional stretching zone 52 is provided to complete stretching the glass ribbon to its final dimensions. The stretched glass ribbon 18 is gradually cooled in a second cooling zone 53, and taken off the bath in a take-off zone 54 at the exit 27 of the chamber 16 to be fed into the annealing lehr 36.

Operation

During the description of the operation of the glass manufacturing chamber in accordance with the principals and teachings of the method of this invention, reference will be made primarily to FIGS. 1 and 2 of the drawings.

Glass forming materials are melted in the glass melting furnace 11 so as to form the molten glass 12. The molten glass is moved through the forehearth 13 and by controlled operation of the tweel 17, a prescribed amount of glass is poured continuously through the entrance 26 of the chamber 16 onto the bath of molten tin 14. In accordance with the teachings of this invention, the glass poured out upon the bath is at a temperature of approximately 1950° F. The poured glass joins a pool of glass already floating upon the tin bath. As the added material joins the pool, the pool of glass widens out and proceeds downstream in the chamber 16 to pass under the first radiation gate 31 separating the flow out zone 46 from the first cooling zone 47. In the flow out zone 46, the heaters 28 supply sufficient heat to the zone to insure that the glass ribbon stays in a molten or plastic state in this zone. Thus, as the molten glass proceeds along the flow out zone 46, sufficient heat is concentrated in the zone such that the glass spreads out upon the bath to a uniform equilibrium thickness of approximately 0.280 inch across the entire width of the ribbon 18.

The first radiation gate 31 separates and insulates the flow out zone 46 from the remainder of the processing chamber 16. In the portion of the chamber beyond the first radiation gate 31, the temperature initially drops off and then is subsequently increased for the purpose of first cooling the glass to a semi-rigid state and thereafter reheating the glass. As the glass ribbon 18 passes under the first radiation gate 31, the glass is in a plastic state and has a temperature in the general range of 1600° F. to 1650° F. However, by the time the glass reaches the edge rolls 49 in the edge holding zone 48, the glass has been cooled to a semi-rigid state and has a temperature of approximately 1400° F. The cooling of the glass is accomplished by means of the coolers 29 in the first cooling zone. At a temperature of approximately 1400° F., the glass ribbon can be gripped by the pairs of edge rolls 51 so that the rolls may apply a retarding force to the glass.

In accordance with the specific teachings of one embodiment of the method of this invention, the electrical heaters 28 mounted above the glass ribbon 18 in the reheat and stretching zone 51 are so controlled that different electrical inputs are made to the heaters in the chamber whereby different amounts of heat are added to the chamber. For example, in the upper portion of FIG. 2, which is designated as the east side of the chamber, a very low controlled input is made to the electrical heating elements in the reheat and stretching zone. Proceeding downwardly in FIG. 2 to the west side of the chamber 16, greater amounts of electrical energy are supplied to the various heaters 28 so that more heat may be generated in the chamber at the different locations. Thus, the east side of the chamber has less heat available for addition to and reheating of the glass ribbon 18 whereas the west side of the chamber has a good deal of heat to add to the glass ribbon 18 passing therethrough.

Figure 4:
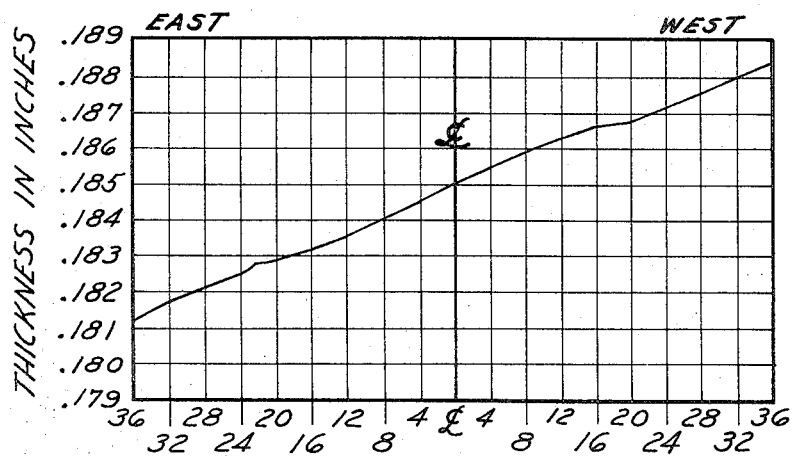
FIG. 4 is a graphical display of the relative temperatures across a ribbon of glas manufactured in accordance with the teachings of this invention.

FIG. 4 shows a temperature profile developed across a glass ribbon manufactured in accordance with the teachings of this invention. The temperature profile is shown as it developed across both the reheat and stretching zone 51 and the stretching zone 52. A greater amount of heat was added to the west side of the chamber than to the east side of the chamber because greater amounts of electrical energy were supplied to the electrical heating elements 28 on the west side of the chamber.

After the reheating of the glass in a non-uniform manner, a stretching of the glass ribbon along the length of the chamber 16 will be occasioned by the pulling force applied to the glass by the rollers 33 in the lehr 36 from the point of retardation of the glass by the edge rolls 49. The rollers 33 have a peripheral velocity which is approximately 2.7 times faster than the peripheral velocity of the edge rolls 49 whereby a differential stretching force is applied to the ribbon of glass 18 as it moves through the stretching zone 52. When the differential stretching force is applied to the glass ribbon 18, the cooler portion of the glass, in this case the east side of the glass, will be stretched to a greater degree than the hotter or west side of the glass ribbon.

FIG. 5 shows graphically the thickness variation across 72 inches of the glass ribbon from the east to the west side. It will be noted that the thickness variation is extremely uniform and that a taper is thereby produced in the glass ribbon.

As shown in FIGS. 4 and 5, control of the heat input to the electrical heating element 28 produces a glass ribbon having a taper ranging from a thin portion on the east side of the chamber to a thick portion on the west side of the chamber at the terminal portion of the stretching zone 52. The glass ribbon then proceeds into the second cooling zone 53 and coolers (not shown) in this zone cool the glass to a temperature such that it is rigid across its entire width. The glass then proceeds into the take off zone 54 at which time the glass is removed from the chamber 16 through the exit 27 thereof to be further processed in the annealing lehr 36.

In the preferred embodiment of the method described herein, the heat input to the electrical heating elements 28 across the width of the reheat and stretching zone 51 are shown as varied from a high input to the elements on the west side of the chamber to a low input to the elements on the east side of the chamber. In such a manner, the west side of the glass ribbon 18 was heated to a temperature in the range of 1650° F. to 1750° F. at which temperature the glass was in a plastic state. On the other hand, the east edge of the glass ribbon remained at a temperature in the range of 1400° F. and 1500° F. and was semi-rigid. With such a combination, glass was produced having a taper from a thick portion on the west side of the glass to a thin portion on the east side of the glass. If necessary, additional coolers may be employed in the portion of the chamber in which the cooler glass is to be processed.

Figure 7:
FIGS. 6 and 7 are other typical cross sections of glass which may be manufactured in accordance with the teachings of this invention.
Figure 6:

Configurations of a glass ribbon 18 as shown in FIGS. 6 and 7, may be achieved by various heating and cooling methods. In the case of the glass ribbon shown in FIG. 6, the edge portions of the ribbon are heated to the highest temperature and the central portion is cooler. In the case of FIG. 7, the center of the ribbon is heated to the hottest temperature.

The cooler portions of the ribbon are attenuated to a greater extent because the hotter portions of the ribbon are still in such a condition, or at such a temperature, that the glass in that vicinity is refloated. Thus, when a force is applied to that area of glass, the area of glass tends to flow with the force thereby contracting in area rather than resisting the force which causes elongation thereof.

When the manufacture of the tapered glass ribbon has been completed, the ribbon may be removed and individual brackets cut therefrom. These brackets of glass will have a taper therein and such brackets may be utilized for constructing thermal windows in accordance with the teachings of copending application Ser. No. 756,441, filed Aug. 30, 1968, and assigned to the same assignee. As the referenced application teaches, the use of two brackets of tapered float glass positioned so that their tapers are reversed in the frame of a thermal window construction eliminates interference fringes which are generated by the utilization of two sheets of glass in such a structure which have identical and uniform thicknesses.

There has been disclosed herein a method of producing float glass which has a taper therein across the width thereof. The taper is produced in the glass ribbon during the processing of the ribbon in the float bath chamber and therefore the finished glass ribbon has surfaces thereon of high lustre and fire polished characteristics. The method of this invention will have many modifications which will be apparent to those skilled in the art in view of the teachings of this specification. It is intended that all modifications which fall within the true spirit and scope of this invention be included within the scope of the appended claims.

What is claimed is:

1. A method of producing a continuous glass ribbon, the ribbon having a tapering thickness across the width thereof, which method comprises the steps of:

melting glass forming materials in a glass melting furnace;

delivering the molten glass to the surface of a molten bath contained in a cavity formed by refractory material housed in a substantially enclosed chamber to form a pool of glass in the chamber;

flowing the molten glass out from the pool in a direction downstream of the chamber to form a ribbon of glass of substantially uniform thickness across the width thereof;

cooling the glass ribbon to a temperature whereat the glass ribbon is in a self-supporting condition;

retarding advancement of the glass ribbon in the direction downstream of the chamber;

differentially heating the glass ribbon across the width of the ribbon to establish a differential temperature profile in the ribbon, the higher temperature portion of the ribbon reaching a pliable, plastic condition while the cooler temperature portion of the ribbon remains in the self-supporting condition;

applying a longitudinal stretching force to the glass ribbon between the position whereat the glass ribbon is retarded and the end of the processing chamber thereby attenuating the glass ribbon differentially to produce a taper in the glass ribbon, the attenuated ribbon being thicker at the portion thereof originally at the higher temperature; and cooling the glass ribbon while attenuated whereby a glass ribbon having a taper therein across its width is produced.

2. The method of producing a glass ribbon having a taper therein as defined in claim 1 wherein the ribbon is differentially heated in a reheating operation by adding more heat to one side of the chamber than to the other side of the chamber whereby one side of the ribbon has its temperature raised to a temperature greater than the other side of the ribbon.

3. The method of producing a glass ribbon having a taper therein as defined in claim 2 wherein the ribbon is retarded by rotating edge rolls respectively engaging the top surface of the ribbon in the vicinity of one of the opposed lateral edges thereof; and wherein a pair of rolls mounted above and below the glass ribbon at the end of the processing chamber engage the opposite surfaces of the ribbon to apply the stretching force to the glass ribbon, the pair of rolls having a peripheral velocity greater than the rotating edge rolls so that the ribbon is subjected to attenuating forces along the length thereof in a direction downstream of the processing chamber.

References Cited
UNITED STATES PATENTS 3,485,614 12/1969 Long _____ 65—99
3,486,878 12/1969 Greenler _____ 65—182

S. LEON BASHORE, Primary Examiner

J. B. HARDAWAY, Assistant Examiner

U.S. Cl. X.R.
65—91, 96, 99, 182